US012008463B2

United States Patent
Ma et al.

(10) Patent No.: US 12,008,463 B2
(45) Date of Patent: Jun. 11, 2024

(54) METHODS AND APPARATUS FOR ACCESSING EXTERNAL MEMORY IN A NEURAL NETWORK PROCESSING SYSTEM

(71) Applicant: Expedera, Inc., Santa Clara, CA (US)

(72) Inventors: Siyad Ma, Palo Alto, CA (US); Shang-Tse Chuang, Los Altos, CA (US); Sharad Chole, San Jose, CA (US)

(73) Assignee: EXPEDERA, INC., Santa Clara, CA (US)

( * ) Notice: Subject to any disclaimer, the term of this patent is extended or adjusted under 35 U.S.C. 154(b) by 0 days.

(21) Appl. No.: 17/848,316

(22) Filed: Jun. 23, 2022

(65) Prior Publication Data

US 2023/0023859 A1   Jan. 26, 2023

Related U.S. Application Data

(63) Continuation-in-part of application No. 17/504,488, filed on Oct. 18, 2021, which is a continuation of application No. 16/568,195, filed on Sep. 11, 2019, now Pat. No. 11,151,416.

(51) Int. Cl.
    *G06N 3/063*     (2023.01)
(52) U.S. Cl.
    CPC .................... *G06N 3/063* (2013.01)
(58) Field of Classification Search
    None
    See application file for complete search history.

(56) References Cited

U.S. PATENT DOCUMENTS

| 9,710,748 B2* | 7/2017 | Ross .................. G06N 3/063 |
| 11,151,416 B2 | 10/2021 | Chuang et al. |
| 2016/0062947 A1 | 3/2016 | Cheltur et al. |
| 2016/0379111 A1* | 12/2016 | Bittner, Jr. ............ G06F 9/3885 |
| | | 706/25 |
| 2016/0379115 A1* | 12/2016 | Burger ................ G06F 15/7803 |
| | | 706/25 |
| 2018/0129893 A1 | 5/2018 | Son et al. |
| 2018/0285715 A1* | 10/2018 | Son .......................... G06N 3/04 |
| 2020/0104669 A1 | 4/2020 | Chole et al. |

(Continued)

*Primary Examiner* — Ryan C Vaughn
(74) *Attorney, Agent, or Firm* — Carr & Ferrell, LLP

(57) ABSTRACT

Artificial intelligence is an extremely computationally intensive field such that it can be expensive, time consuming, and energy consuming. Fortunately, many of the calculations required for artificial intelligence can be performed in parallel such that specialized processors can greatly increase computational performance. Specifically, artificial intelligence generally requires large numbers of matrix operations to implement neural networks such that specialized matrix processor circuits can improve performance. To perform all these matrix operations, the matrix processor circuits must be quickly and efficiently supplied with data to process or else the matrix processor circuits end up idle or spending large amounts of time loading in different weight matrix data. Thus, apparatus and methods are provided for efficiently operating external interfaces on neural network processors that efficiently interleave and overlap external memory operations along with computation operations such that both the external interface and matrix processor circuits are used efficiently.

20 Claims, 15 Drawing Sheets

(56) References Cited

U.S. PATENT DOCUMENTS

2020/0117400 A1\* 4/2020 Golov .................... G06N 5/04
2021/0073585 A1 3/2021 Chuang et al.
2021/0174177 A1\* 6/2021 Yu ........................ G06N 3/063

\* cited by examiner

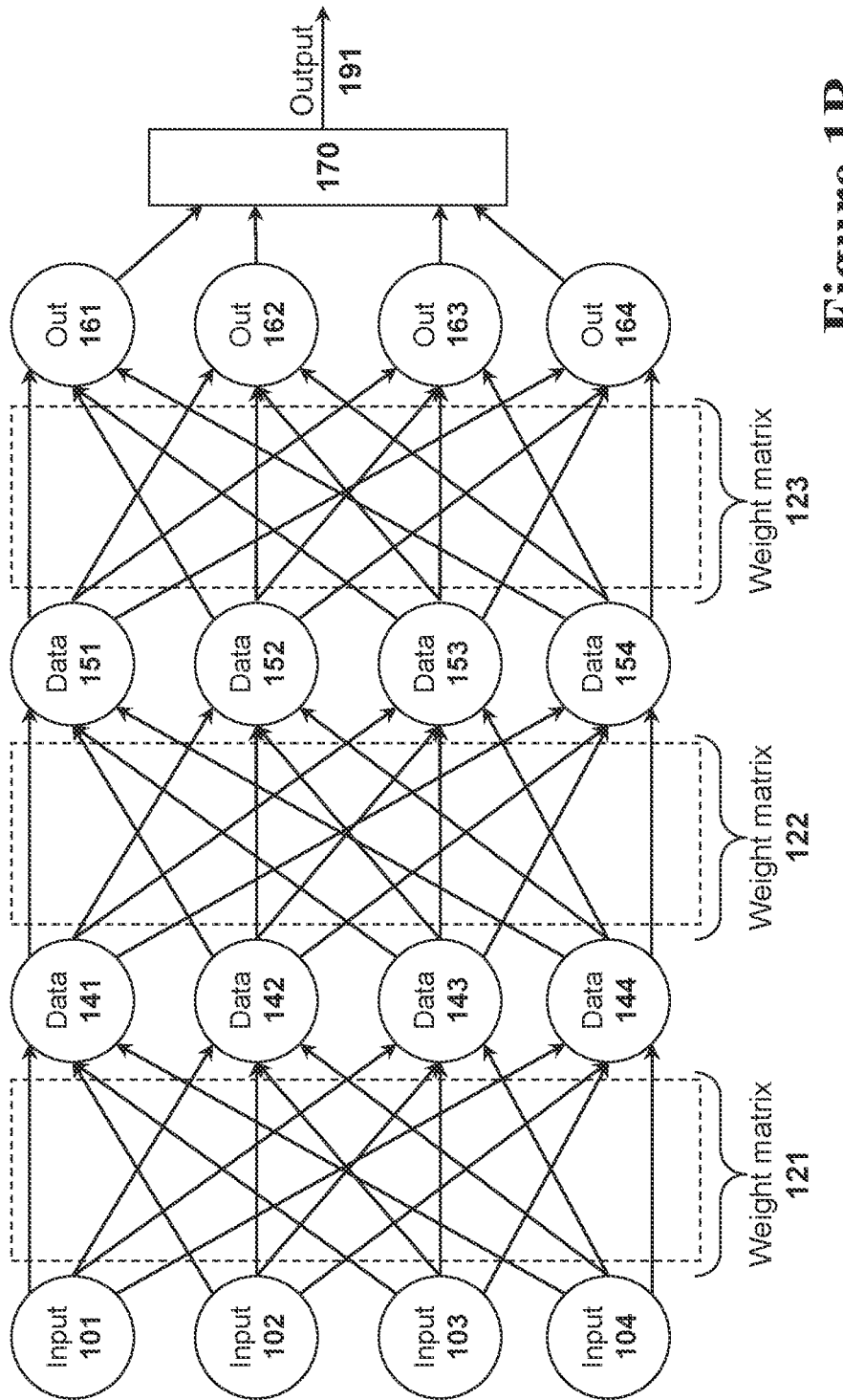

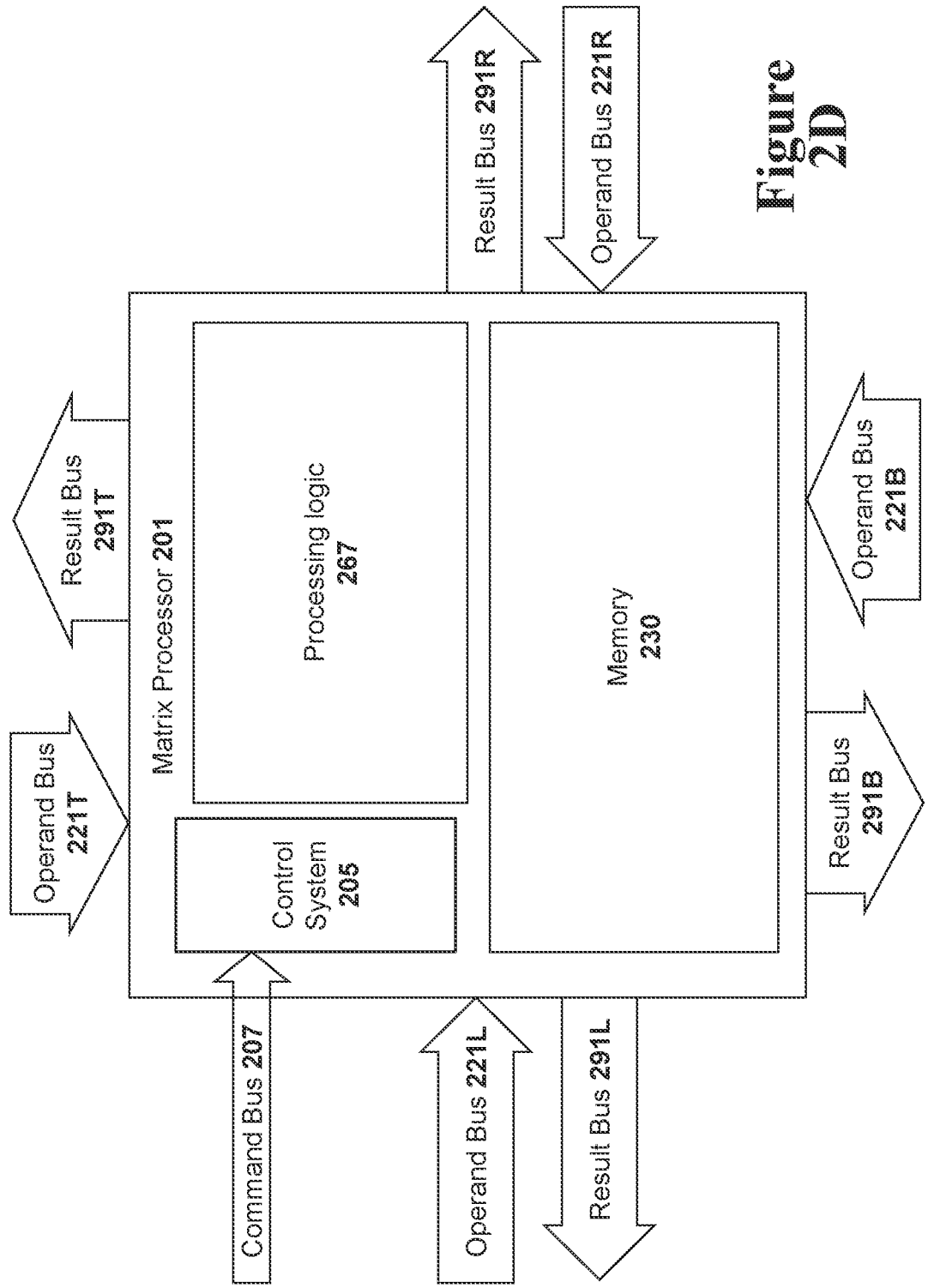

Figure 5A
Figure 5B
Figure 5C

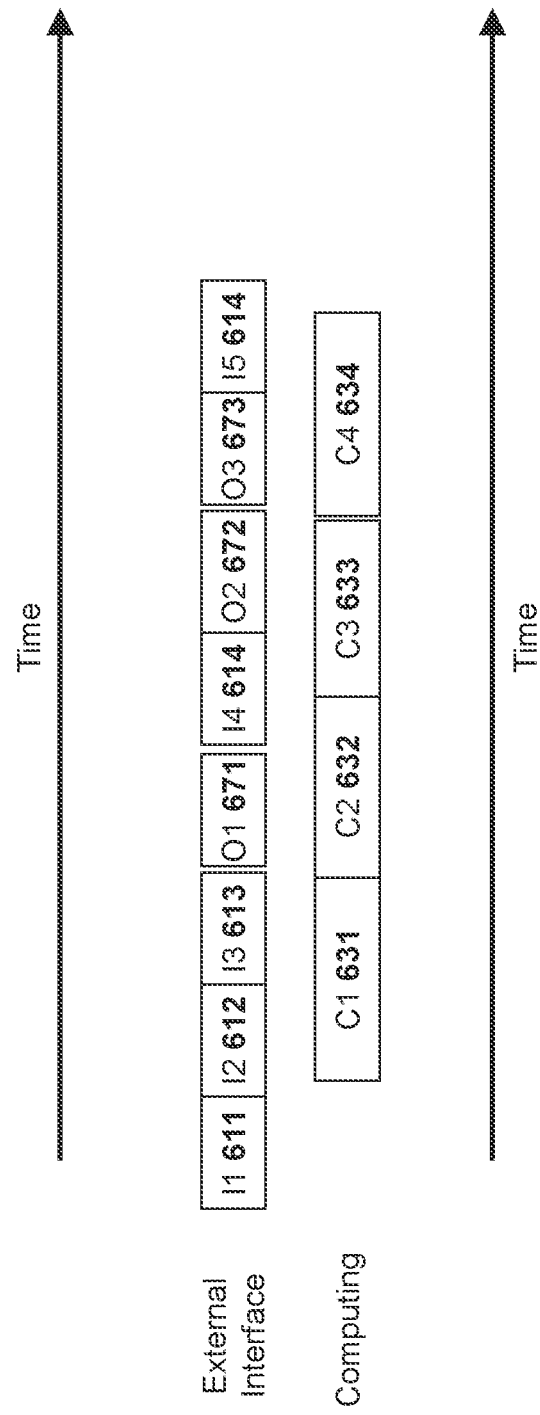

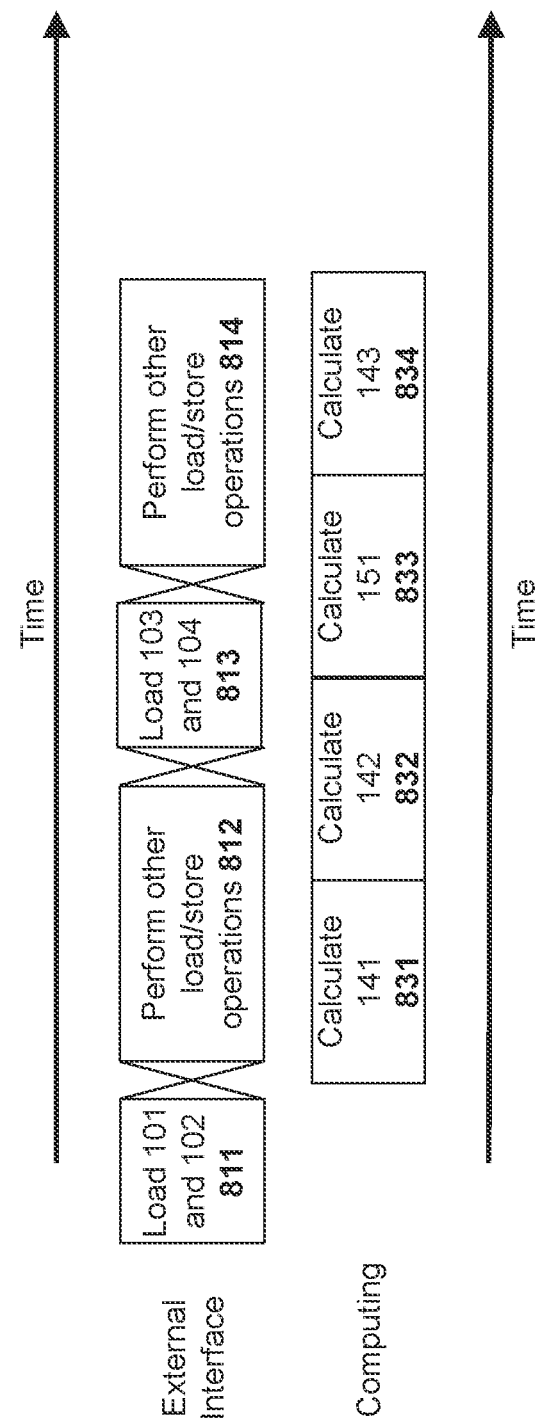

METHODS AND APPARATUS FOR ACCESSING EXTERNAL MEMORY IN A NEURAL NETWORK PROCESSING SYSTEM

RELATED CASES

The present disclosure is a continuation-in-part of the patent application with Ser. No. 17/504,488, filed on Oct. 18, 2021, and titled "Method and Apparatus For Efficiently Processing Convolution Neural Network Operations".

TECHNICAL FIELD

The present invention relates to the field of digital processing circuits. In particular, but not by way of limitation, the present invention discloses digital circuit designs, control systems, and operating modes for managing on and off-chip data accesses for digital circuits that perform matrix operations.

BACKGROUND

Computer system designers are always attempting to design faster and faster computer systems. Faster computer systems allow for extremely complex computational models such as weather prediction, protein-folding, celestial mechanics, artificial intelligence, and complex three-dimensional video renderings to be performed faster. Furthermore, the computational models being simulated can be made ever more detailed thus rendering more accurate results.

To design faster computer systems, many different techniques are used. One of the simplest techniques is to increase the clock speed at which computer systems operate although it is becoming much more difficult to increase the clock speed due to the physics of current transistor materials. Processing wider data structures can also increase computer performance, but this only helps for certain types of computational tasks that can take advantage of wider data structures. Two popular techniques for improving processing speeds are parallel processing such as implementing multiple computational cores within a computer processor and combining thousands of different computer systems on a computer network to cooperate on a single computational problem.

One of the fields most in need of specialized processors is the field of Artificial Intelligence (AI). Artificial Intelligence is increasingly being used for a wide variety of complex tasks such as image recognition, High-Performance Computing (HPC), scientific computing, machine learning, data mining, speech recognition, and self-driving vehicles. Artificial Intelligence applications tend to rely very heavily on matrix operations from the mathematical field of linear algebra. Specifically, matrix operations are required to implement artificial neural networks (ANNs) that learn from a set of training data and then later apply that learning to new input data.

Due to the very heavy usage of matrix computations, artificial intelligence is a very computationally intensive field of computing desperately in need of computational optimizations. One of the most popular techniques to improve artificial intelligence application performance is to create specialized digital processing circuits for performing the matrix operations needed to implement an artificial neural network. Specialized matrix processors take advantage of the parallelism inherent in matrix operations and thus efficiently execute the matrix calculations commonly used within artificial intelligence.

Artificial Intelligence systems perform vast amounts of matrix calculations. The matrix calculations performed by artificial intelligence systems are often performed repeatedly with the same set of matrix weights but different data sets. Similarly, a data set may be processed through a series of matrix operations generating intermediate results and then ending with a final result. Each of these matrix calculations involves moving a large amount of data from memory storage into and out of the matrix processors. These memory storage access operations can consume large amounts of power and can slow computation time. Without proper coordination, these memory storage accesses can slow down the performance of the dedicated processor. Therefore, it is desirable to further develop new techniques for organizing and controlling multiple matrix processor circuits efficiently in order to optimize the computational tasks associated with implementing artificial neural networks.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings generally illustrate, by way of example, but not by way of limitation, various embodiments discussed in the present document.

FIG. 1B illustrates a conceptual diagram of a three-layer artificial neural network.

FIG. 2D illustrates a block diagram of an abstracted matrix processor circuit with bus interfaces on all sides.

FIGS. 5A to 5C illustrate timing diagrams of the processing of a neural network using input operations simultaneous with computation operations in order to optimize external interface usage.

FIG. 6 illustrates timing diagram of processing of a neural network using input and output interleaving techniques that further optimize external interface usage.

FIG. 8A illustrates a timing diagram processing of a neural network with out-of-order processing.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments may not be required in order to practice the present invention. For example, although some of the example embodiments are disclosed with reference to a specific matrix processor circuit implementation, the disclosed techniques may be used with any other implementations of a matrix processor circuit. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Neural Networks Overview

One of the core techniques in artificial intelligence (AI) is the use of artificial neural networks (ANNs). Artificial neural networks first learn from training data and then are later used to make logical inferences from new input data. Artificial neural networks were originally designed to be similar to the biological neuron networks in animal brains.

Figure 1A:
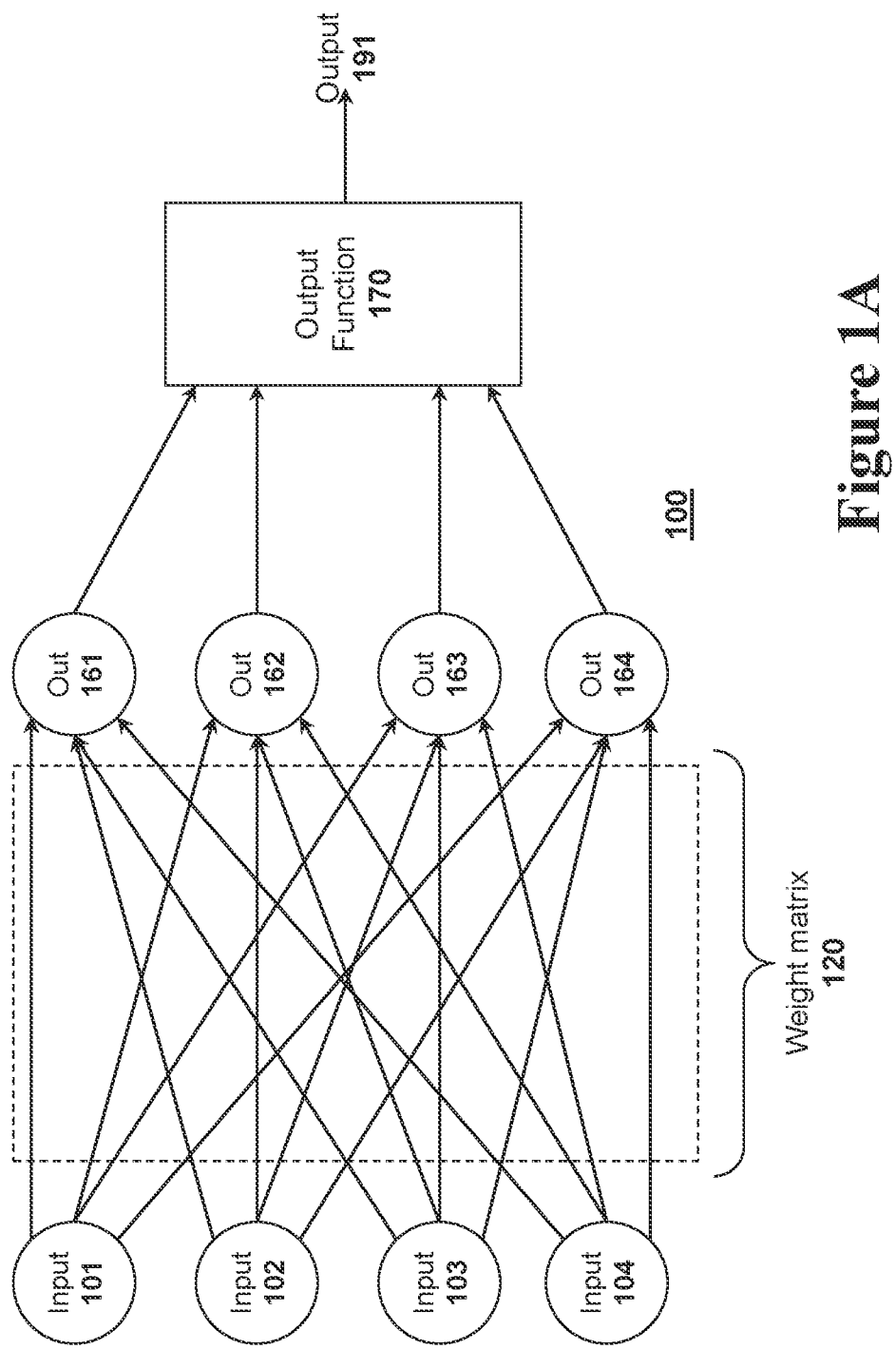
FIG. 1A illustrates a conceptual diagram of a single-layer artificial neural network.

FIG. 1A illustrates a conceptual diagram of a very simple single-layer four-input artificial neural network 100. Referring to FIG. 1A, an input data vector (made up of input data 101 to 104) is provided with training data during training sessions and then with new input data when the artificial neural network is used to make inferences. The input data vector (made up of input data 101 to 104) is processed with weight data stored in a weighted matrix 120 to create an output data vector (made up of output data 161 to 164). Many different types of data processing may be performed using weighted matrix 120 (such as a Hadamard product, Frobenius inner product, matrix addition, etc.) However, this document will focus on the well-known matrix product.

After processing the input data vector with the weighted matrix 120 the system creates the output data vector (made up of output data 161 to 164). The output data vector may be combined with an output function 170 to create a final output 191 for the artificial neural network 100. The output function 170 may be referred to as an activation function. During training sessions, the output data may be compared with a desired target output (not shown) and the difference between the output data and the desired target output may be used to adjust the weight data within weight matrix 120 to improve the accuracy of the artificial neural network 100.

Note that the four-input artificial neural network of FIG. 1A illustrates just one example of a simple small artificial neural network 100. Artificial neural networks may be constructed much wider than just four inputs. Multiple independent artificial neural networks may be used in parallel and the outputs of the independent artificial neural networks may be combined.

Artificial neural networks may comprise many layers of weight matrices such that very complex computational analysis of the input data may be performed. For example, FIG. 1B illustrates a three-layer artificial neural network wherein the input data vector (made up of inputs 101 to 104) is processed with a first weighted matrix 121 to create a first intermediate data vector (made up of data 141 to 144). Next, the first intermediate data vector (made up of data 141 to 144) is processed with a second weighted matrix 122 to create a second intermediate data vector (made up of data 151 to 154). Then second intermediate data vector (made up of data 151 to 154) is processed with a third weighted matrix 123 to create the output data vector (made up of outputs 161 to 164). Output data vector (made up of outputs 161 to 164) may then be processed by output function 170 to create a final output 191. Alternatively (or in addition to), the output data vector (made up of outputs 161 to 164) may also be used as intermediate data that is fed into additional artificial neural network layers (not shown) such that very complex hierarchical artificial neural networks may be created.

Figure 1C:
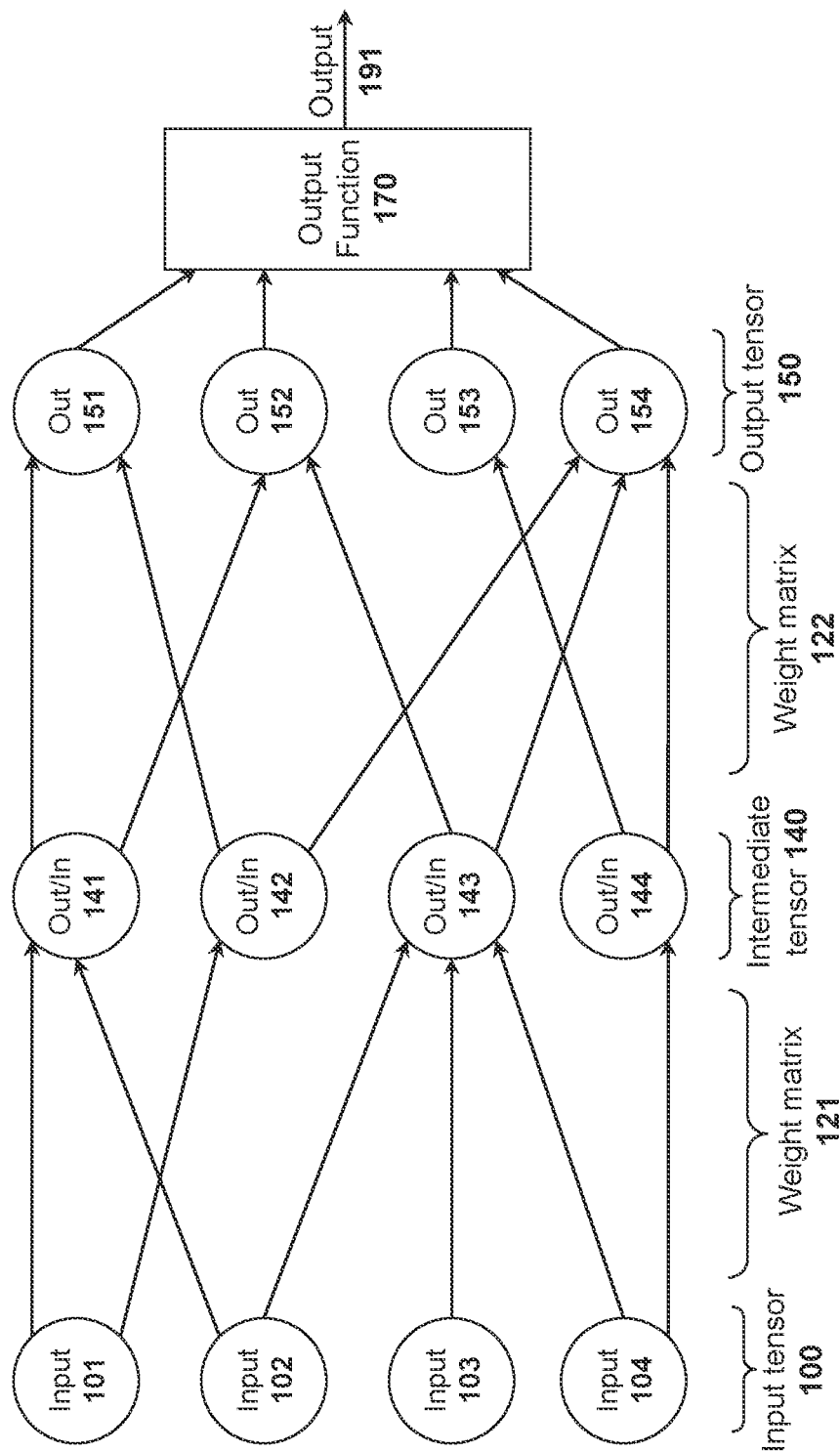
FIG. 1C illustrates a conceptual diagram of a sparse two-layer artificial neural network.

Note that not all input data and intermediate data affect all subsequent intermediate and output data. For example, FIG. 1C illustrates a much more sparse example neural network. For example, as illustrated in FIG. 1C, only inputs 101 and 102 affect intermediate data 141 instead of all the input data (101 to 104).

Example Matrix Processor Circuit

As illustrated with reference to FIGS. 1A to 1C, artificial intelligence relies upon large amounts of very computationally intensive matrix operations to initially learn using training data to adjust the weights in the weight matrices. Later, those adjusted weight matrices are used to perform complex matrix computations with a set of new input data to draw inferences upon the new input data. Fortunately, the linear algebra matrix operations used in an artificial neural network allow for many performance optimizations to be made since there is a significant amount of parallelism in the matrix computational tasks that are required. Thus, many specialized processors for artificial intelligence applications have been created. These specialized AI processors may use a Single Instruction Multiple-Data (SIMD) architecture wherein wide data vectors are processed with each instruction such that matrix operations can be performed efficiently.

To provide optimal processing for artificial intelligence tasks, specialized matrix processors may be used. A matrix processor is a digital processing circuit that has been designed to help efficiently perform artificial intelligence computational tasks. Specifically, a matrix processor is designed in a manner to rapidly read input data vectors, output data vectors, and matrix weight data in a parallel format for high throughput. In this manner, the matrix processor can be used for forward propagation inferences as well as for backpropagation artificial intelligence learning.

Figure 2A:
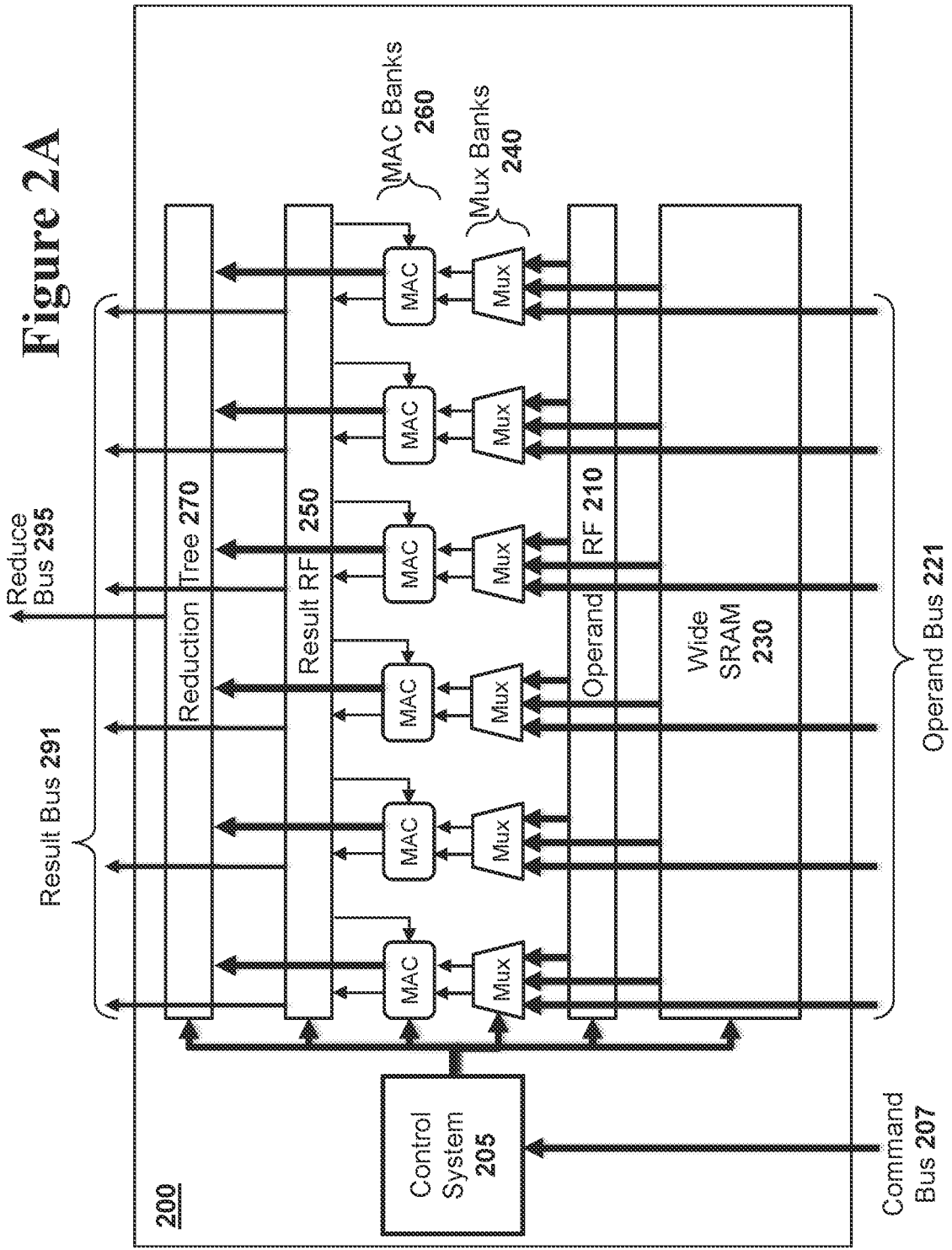
FIG. 2A illustrates a block diagram of one embodiment matrix processor circuit that may be used to perform matrix calculations.

FIG. 2A illustrates a block diagram of one embodiment of an example matrix processor circuit 200 that handles a data vector with six data elements. Note that matrix processor circuits can be made to handle data vectors with many more or fewer data elements within each data vector.

The matrix processor circuit 200 of FIG. 2A includes a local wide Static Random Access Memory (SRAM) bank 230. The wide SRAM bank 230 is configured such that entire wide rows of data can be accessed in a single memory cycle. In this manner, an entire input data vector or an entire row of weight values from a weight matrix may be read out from the SRAM bank 230 or written to the SRAM bank 230 in a single memory cycle. The matrix processor circuit 200 also includes an operand register file 210 for storing input data vectors and other data vectors that may be used as operands during computations.

The wide SRAM bank 230, the operand register file 210, and an operand bus 221 are coupled to a bank of multiplexors 240 that provide operand data to a bank of Multiply and Accumulate (MAC) units 260. A local control system 205 within the matrix processor circuit 200 controls all these individual circuit elements to perform the required data vector processing operations. Thus, local control system 205 selects between data stored within the wide SRAM 230, data in the operand register file 210, and data on operand bus 221 to be provided to the Multiply and Accumulate (MAC) units 260 for data vector processing.

Calculation output results from the bank of Multiply and Accumulate (MAC) units 260 may be stored in result register file 250. These output results may be output in raw form in parallel using result bus 291. Alternatively (or in addition to the raw output data), the results in the result register file 250 may be combined with reduction tree 270 to provide a single output on reduce bus 295. Note that the reduction tree 270 may be implemented outside of the matrix processor circuit 200.

Note that for some operations, the results stored in the result register file 250 may be used as an input operand in a subsequent data vector calculation. To handle such calculations, there are data paths from the result register file 250 back to a bank of Multiply and Accumulate (MAC) units 260. Local control system 205 is used to control exactly how the Multiply and Accumulate (MAC) units 260 will select the input data to be processed and how the input data will be processed by the Multiply and Accumulate (MAC) units 260.

Figure 2B:
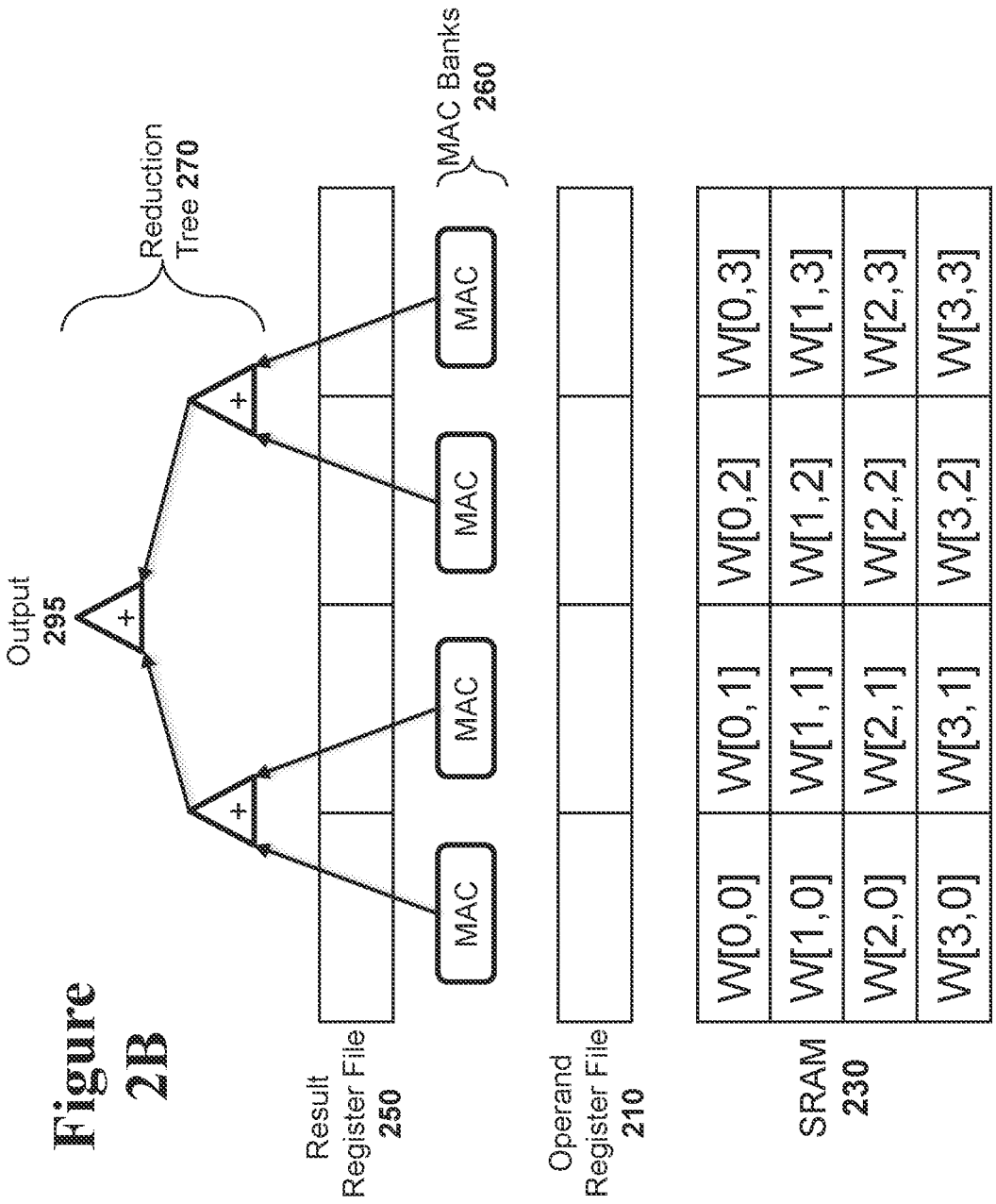
FIG. 2B illustrates a conceptual diagram of the matrix processor circuit of FIG. 2A with a four-by-four weight matrix consisting of sixteen weight value elements W[0,0] to W[3,3] stored within the wide SRAM memory system.

FIG. 2B conceptually illustrates how a four by four weight matrix consisting of elements W[0,0] to W[3,3] may be stored within the wide SRAM bank 230. Note that the weight values in the weight matrix are stored in alignment with the underlying SRAM 230 memory's row structure such that entire rows of weight values can be read out of the wide SRAM bank 230 in a single memory cycle. For example, weight values W[0,0], W[0,1], W[0,2], and W[0,3] from a first row in a weight matrix may be read out of wide SRAM bank 230 in a single memory cycle and provided simultaneously to the individual Multiply And Accumulate (MAC) units in the MAC bank 260 in parallel. The other input operands for a computation may come in parallel from the operand register file 210 or from the operand bus (not shown in FIG. 2B) to the MAC bank 260.

The matrix processor circuit 200 of FIGS. 2A and 2B illustrates only one possible embodiment of a matrix processor circuit. Details of the matrix processor circuit 200 of FIGS. 2A and 2B can be found in the U.S. patent application Ser. No. 16/149,054 and titled "Methods and Apparatus for Constructing Digital Circuits for Performing Matrix Operations" which is hereby incorporated by reference. However, matrix processor circuits can be implemented in many different manners and in many different sizes.

Abstracted Matrix Processor Circuit

Matrix processor circuits can be implemented in many different sizes and in many different manners. However, to further efficiently process matrix operations, multiple matrix processor circuits may be combined together in efficient manners such that a controlled network of matrix processor circuits can perform a wide variety of matrix operations. Thus, to simplify this disclosure an abstracted matrix processor circuit will be disclosed with reference to FIG. 2C.

Figure 2C:
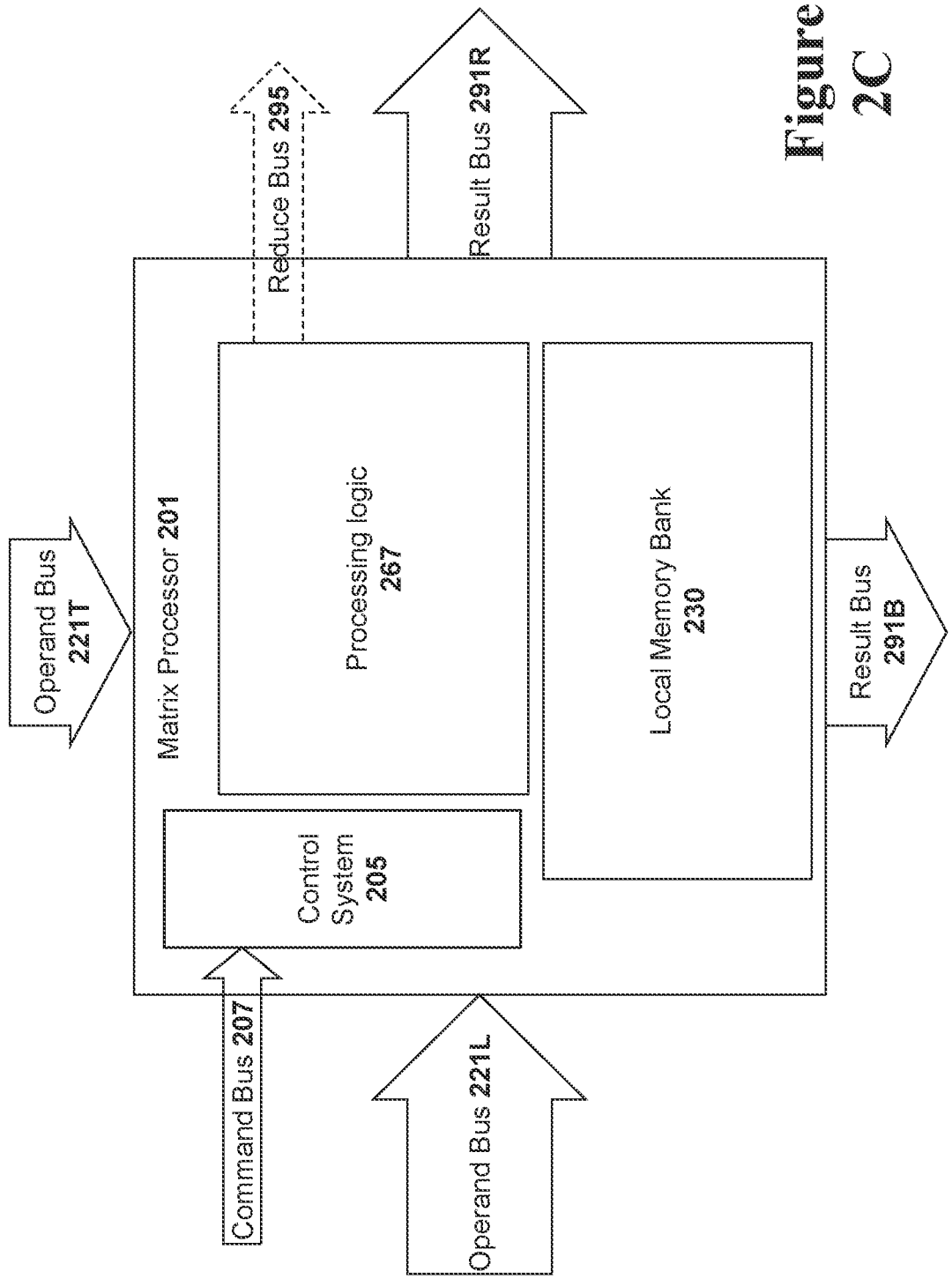
FIG. 2C illustrates a block diagram of an abstracted matrix processor circuit that may be used to perform matrix calculations.

FIG. 2C illustrates a first block diagram of an example abstracted processor circuit 201. The abstracted matrix processor circuit 201 receives input data on one or more operand buses. In the particular embodiment of FIG. 2C, there are two operand buses: operand bus from the top 221T and operand bus 221L from the left. Data received on the operand buses may be used directly by the processing logic 267 or may be stored in memory bank 230 for later usage. The data received may comprise weight matrix data, input data operand vectors, or other data. The memory bank 230 may also include register files closely coupled to the processing logic 267. Note that operand and result buses may be placed on all of the different sides of the matrix process array circuit. FIG. 2D illustrates an example that has operand buses (221T, 221B, 221L, and 221R) and result buses (291T, 291B, 291L, and 291R) on all sides.

Referring back to FIG. 2C, the matrix processor circuit 201 also receives commands on command bus 207. The control system 205 within the matrix processor circuit 201 parses the commands received and uses the commands to determine how the processing logic 267 will be used to process data. The processing logic 267 may be implemented in many different manners as long as the matrix processor 201 performs the desired matrix operations and outputs the proper matrix operation results. For example, the processing logic 267 may be implemented with a single-instruction multiple-data (SIMD) processor, a digital signal processor (DSP), a conventional central processing unit (CPU) core, a highly parallelized specialized matrix processor circuit 200 as illustrated in FIGS. 2A and 2B, or in any other manner that performs the desired matrix operations.

The abstracted matrix processor circuit 201 may be designed to operate using many different types of data formats and data precision levels. For example, the abstracted matrix processor circuit 201 may process integers, 16-bit floating point numbers, 32-bit floating point numbers, or any other data format. Many different matrix operations may be implemented in the abstracted matrix processor circuit 201. Two well-known matrix operations that may be included are the matrix dot product and the matrix cross products.

The control system 205 instructs the processing logic 267 to output the results of requested matrix operations on one or more result bus 291. In some embodiments, the matrix processor 201 will include the reduction logic to output a reduced form of the result on a reduce bus 295. As will be described later, reduction logic may also be implemented outside of the matrix processor circuit 201.

The operand buses 221T and 221L are wide parallel buses such that entire input data vectors may be loaded into the abstracted matrix processor circuit 201 in a single cycle. Similarly, entire weight matrix rows from a weight matrix may be read into the local memory bank 230 of the abstracted matrix processor circuit 201 in a single cycle. Similarly, the result buses 291R and 291B are also wide parallel buses such that entire output data vectors can be output from the abstracted matrix processor circuit 201 in a single cycle. The local memory bank 230 is a very important component of the abstracted matrix processor circuit 201. As set forth earlier, the memory bank 230 of the abstracted matrix processor circuit 201 is both wide and deep to optimize performance.

The local memory bank 230 is wide in that entire data vectors can be written into or read out of the local memory bank 230 in a single cycle. For example, in a large matrix processor circuit 201 that handles a 16 by 16 element matrix wherein each element is a 16-bit floating-point value, the local memory bank 230 can read out 256-bit values such that entire sixteen element data vectors of 16-bit data values each can be read out of the local memory bank 230 in a single cycle.

The local memory bank 230 is deep in that it is constructed large enough to store multiple different sets of weight matrices. In this manner, the matrix processor circuit 201 can be used to perform matrix operations for multiple different artificial neural network layers without having to reload different matrix weight values. For example, if a matrix processor circuit 201 cannot perform an operation for one particular neural network layer because a required input data vector is not yet available, that matrix processor circuit 201 can instead be used to perform matrix operations for other neural network layers or for other neural networks. A deep memory bank 230 allows the matrix processor 201 to be used very efficiently since it can handle a steady stream of requested matrix operations for many different neural networks without ever needing to load in new weight matrix data. Loading in weight matrix data can be one of the most time consuming (and energy consuming) tasks for a matrix processor circuit 201.

In addition to storing weight values for multiple different weight matrices, the local memory bank 230 can be used to store other information that may be needed such as input data vectors, output data vectors, error vectors, etc. Intermediate result data vectors from forward pass operations may be stored in the memory local bank 230 and then later accessed when performing a related back propagation operation. Another very important type of data that may be stored in the local memory bank 230 is matrix weight gradients. A matrix weight gradient comprises a matrix of adjustments for a weight matrix that may be periodically used to update the weight matrix.

Combining Matrix Processors into an Array

The abstracted matrix processor circuit 201 illustrated in FIG. 2C can be used alone to perform simple matrix operations very quickly. For example, the matrix processor circuit 201 can be used to fully process the very small artificial neural network illustrated in FIG. 1A. It could also be used to implement the small three-layer artificial neural network illustrated in FIG. 1B by using it serially to perform the required matrix calculations of all three artificial neural network layers 121, 122, and 123.

However, most artificial neural networks must handle much larger data input vectors and output vectors than the very small example artificial neural networks illustrated in FIGS. 1A and 1B. It is therefore desirable to combine the computing capabilities of many different matrix processor circuits 201 in order to process wider artificial neural networks and multi-layer artificial neural networks. In this manner, much larger multi-layer artificial neural networks that are used to perform useful artificial intelligence tasks can be handled very efficiently.

Figure 3A:
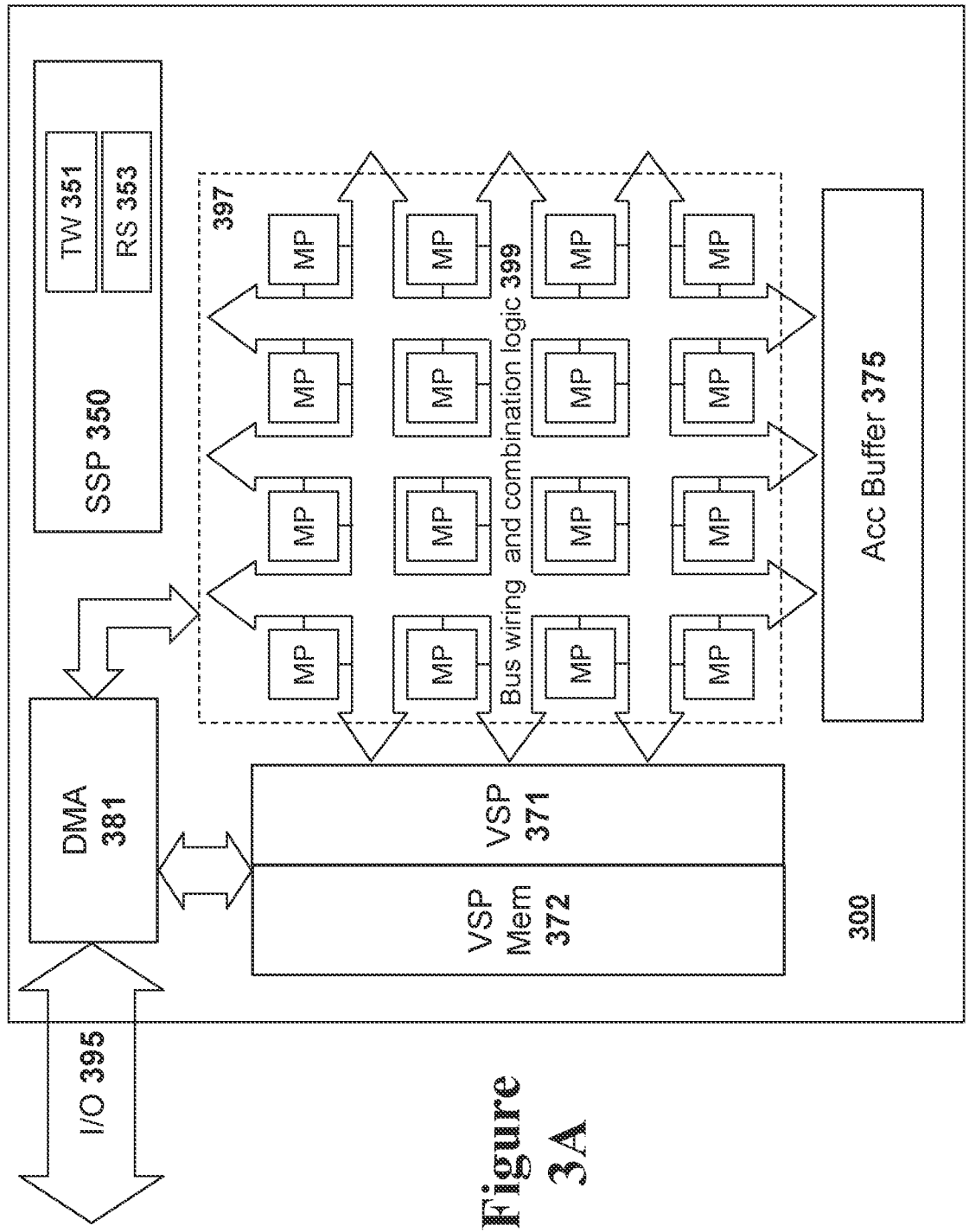
FIG. 3A illustrates a block diagram of an array of matrix processors used to create a Neural Processing Unit (NPU).
Figure 3B:
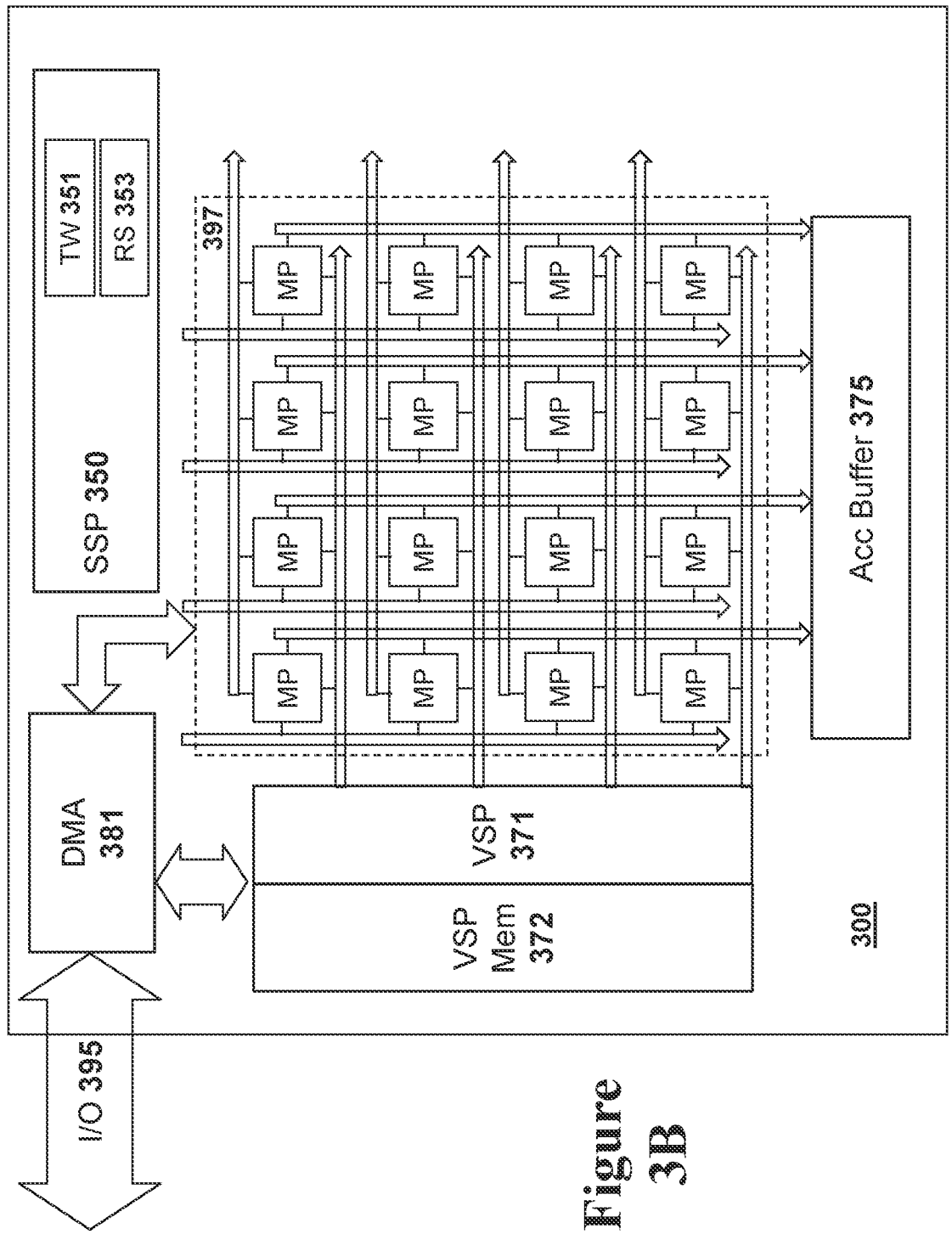
FIG. 3B illustrates one embodiment of the Neural Processing Unit (NPU) of FIG. 3A.

FIG. 3A illustrates a block diagram of a first embodiment of an architecture using multiple matrix processor circuits in a coordinated matter to efficiently process wide multi-layer artificial neural networks. In FIG. 3A, each individual matrix processor circuit is labelled as "MP" for matrix processor. As illustrated in the example of FIG. 3A, the matrix processor circuits are arranged in a grid array format. In between the individual matrix processor circuits of the matrix processor array is bus wiring and combination logic 399 that couples all the individual matrix processor circuits in the array to buffers that carry input data vectors, matrix weight values, and result data vectors. The array of matrix processors and the bus wiring and combination logic 399 may be referred to as a matrix processor array 397. The bus wiring and combination logic 399 may be implemented in different manners to achieve different goals.

To provide input data vectors to the matrix processor array 397 in one embodiment, a Vector Scalar Processor (VSP) 371 is coupled to an operand bus of every individual matrix processor circuit in the matrix processor array 397 with bus wiring 399. This may be accomplished by coupling operand bus 221L, as illustrated in FIG. 2C. In this manner, data vectors can be loaded into the individual matrix processor circuits in the matrix processor array 397. The data vectors may comprise weight matrix rows, input data vectors, or any other required data for the processing operations to be performed. Note that since there are multiple buses, these data vector loading operations can be performed in parallel.

Similarly, the result bus of every individual matrix processor circuit in the array is coupled to an accumulation buffer (Acc Buffer) 375 on the bottom of the matrix processor array 397 using bus wiring and combination logic 399. This may be accomplished by coupling result bus 291B of FIG. 2C to accumulation buffer 375 (Acc Buffer) on the bottom as illustrated in FIG. 3A. The accumulation buffer 375 contains both storage for storing result data vectors and processing logic for performing various vector processing operations on received result data vectors. For example, the accumulation buffer 375 can combine partial result data vectors from multiple different matrix processor circuits into a single complete output data vector result.

All of the individual matrix processor circuits in the matrix processor array 397 receive commands on their individual command buses. In this manner, each individual matrix processor circuit in the array can be controlled individually. For example, the individual matrix processor circuits can be informed when data is available on their operand buses and what operations to perform. By carefully controlling each individual matrix processor circuit in the matrix processor array 397 in a coordinated manner, the matrix processor array 397 becomes a very powerful system for efficiently processing matrix operations needed for neural network applications. Specifically, the matrix processor array 397, along with all the supporting circuitry (Accumulation Buffer 375, Vector Scalar Processor 371, Direct Memory Access unit 381, etc.) may be referred to as a Neural Processing Unit (NPU) 300.

Neural Processing Unit External Data Management Overview

To process neural networks within the matrix processor array 397 of FIG. 3A, the Neural Processing Unit (NPU) 300 must receive data from an external source. As illustrated in FIG. 3A, there is an Input/Output (I/O) interface 395 for the Neural Processing Unit (NPU) 300 controlled by a Direct Memory Access (DMA) 381 that can receive and send data from outside of the Neural Processing Unit (NPU) 300.

To operate most efficiently, the Neural Processing Unit (NPU) 300 must use its various internal memories and the external data sources coupled to Input/Output interface 395 as efficiently as possible. Ideally, the Neural Processing Unit (NPU) 300 of FIG. 3A will generally have the data that it needs to perform matrix computations stored in internal local memories as frequently as possible such that processing can occur without interruption. When accesses to external data sources over Input/Output (I/O) interface 395 are made, such external access operations should be made as rarely as possible and as efficiently as possible. Thus, the Neural Processing Unit (NPU) 300 should try to keep important data that will be reused within the internal memories until it is no longer needed.

Neural Processing Unit Overview

Referring to FIG. 3A, the Neural Processing Unit (NPU) 300 is controlled by a Scheduler & Sequence Processor (SSP) 350. The Scheduler & Sequence Processor (SSP) 350 is responsible for sending all the cycle commands to the vector scalar processor (VSP) 371 and all the various individual matrix processor (MP) circuits within matrix processor array 397.

The Scheduler & Sequence Processor (SSP) 350 may include a Tree Walker (TW) 351 and a Row Sequencer (RS) 353. The Tree Walker (TW) 351 walks a neural network tree and is responsible for obtaining the data slices needed for processing. The Row Sequencer (RS) 353 may not just handle one row at a time, it can combine multiple rows into a single row sequence. The Row Sequencer (RS) 353 is responsible for implementing all the cycle commands for each data slice. Every operating cycle, each vector scalar processor (VSP) 371 follows the received cycle commands from Scheduler & Sequence Processor (SSP) 350. The same is true for the matrix processors within the matrix processor array 397, the Accumulation Buffer 375, and the Direct Memory Access (DMA) unit 381. Every resource needs to be carefully sequenced for the Neural Processing Unit (NPU) 300 to operate properly. Thus, a set of cycle commands needs to be generated for each operating cycle.

The Direct Memory Access (DMA) unit 381 may issue multiple requests in parallel. This document will use the term Direct Memory Access (DMA) unit, which may be used to access external DRAM memory. However, the DMA unit 381 should be considered a generic memory access system that may be used to access any different type of memory storage system (DRAM, SRAM, flash memory) with any type of memory interface (serial memory bus, network access, parallel bus, etc.). Additional information about the DMA unit 381 will be provided in a later section.

A computer system may use many Neural Processing Units 300 within artificial intelligence focused computer system. Different Neural Processing Units may be controlled in a manner to cooperate on the same neural network problem. (Alternatively, a single Neural Processing Unit may be partitioned into multiple areas and process completely different matrix computational problems simultaneously within the same Neural Processing Unit.) When several different Neural Processing Units are cooperating on the same computational problem, the DMA system 381 may be used to transfer data from one Neural Processing Unit to another Neural Processing Unit. This allows different Neural Processing Unit to address different stages or layers of the same neural network computational problem.

The matrix processor array 397 is responsible for processing convolutions and fully connected (FC) neural network layers. The matrix processor array 397 can also do groupwise convolutions. There may be partial summation units within the bus wiring and combination logic 399 that can combine data values on the way to the Accumulation Buffer 375.

The Accumulation Buffer 375 is responsible for the accumulation of results from various different matrix processors in the matrix processor array 397. The Accumulation Buffer 375 may also perform quantization operations. The Accumulation Buffer 375 may also perform activation functions for a neural network. For example, the ReLU (Rectified Linear Unit), PReLu (Parametric ReLu), Leaky ReLU, and other well-known activation functions may be performed within the Accumulation Buffer circuitry 375. It should be noted that some activation functions can also be performed in the vector scalar processor (VSP) 371 as well.

The vector scalar processor (VSP) 371 is responsible for other computations not performed within the matrix processor array 397 or Accumulation Buffer 375. The vector scalar processor (VSP) 371 can perform pooling functions such as the max pool and average pool functions commonly used in convolutional neural networks. The vector scalar processor (VSP) 371 can also perform data reshape functions. For example, data can be changed from one data format to another data format in order to increase or decrease the precision of data. The vector scalar processor (VSP) 371 has its own dedicated VSP memory 372 illustrated as a VSP memory block to the left of the vector scalar processor (VSP) 371.

Each matrix processor (MP) within the matrix processor array 397 includes its own local memory (as previously described as local memory 230 in FIG. 2D). This local matrix processor memory is largely used for storing neural network weight matrices. Note that matrix weights can also be loaded just in time from the vector scalar processor (VSP) 371; however, to reduce power consumption and memory port bandwidth usage, the matrix weights are often stored within the local matrix processor memory. This local storage of matrix weights allows the reuse of those matrix weights as much as possible. The local matrix processor memory 230 may also be used for storing intermediate results.

Neural Processing Unit Data Access.

The Neural Processing Unit 300 of FIG. 3A sends and receives data from outside of the Neural Processing Unit 300 using the Direct Memory Access (DMA) 381 coupled to an Input/Output port 395. Note that this document will specifically refer to "Direct Memory Access", however, the term direct memory access in this document can apply to any data movement into or out of the Neural Processing Unit 300. For example, the DMA unit 381 may access off-chip DRAM memory, or it may access memory from a different partitioned area of the same integrated circuit chip.

In one embodiment, the Direct Memory Access system (DMA) 381 will access a high-speed memory system such as an external Double Data Rate (DDR) memory system. However, all the disclosed techniques related to the accessing of data outside of a Neural Processing Unit 300 apply to any type of external interface system for accessing data and any type of data storage system. For example, the external interface system 395 of the DMA unit 381 may comprise a Peripheral Component Interconnect Express (PCIe) bus to obtain data from an external source. Similarly, the external interface system 395 may comprise a Mobile Industry Processor Interface (MIPI) bus. Another data bus type of interface is the Advanced eXtensible Interface (AXI) bus that is commonly used with ARM (Advanced RISC Machine) based processor systems.

Beyond just data bus systems, the techniques can be used to access any type of computer network system to access data on any network accessible storage system. For example, the Direct Memory Access (DMA) system 381 may access the well-known Ethernet interface to access data on a server coupled to a computer network. Alternatively, the DMA system may access data stored locally on the same chip using an on-chip data fabric. For example, as set forth earlier, a complex neural processing chip may include multiple different Neural Processing Units 300 that cooperate to perform neural network processing tasks. Thus, the Direct Memory Access (DMA) system 381 may use the on-chip data fabric to transfer data between different Neural Processing Units 300 implemented on the same chip.

The Direct Memory Access (DMA) system 381 may operate with all different types of master and slave interface systems. With master types of interfaces, the master is in control of the interface. Thus, with a master type of interface the DMA system 381 can initiate data transfers at any time. With a slave type of interface, the DMA system 381 can only initiate data transfers when the slave interface receives permission from the master of the interface system. The slave can issue an "indicate status" message to the master, informing the master whether the slave can currently receive or send data. The master of the interface system may then inform the slave when the slave can send data such that the DMA system 381 on the slave interface can then respond with a transfer of data.

A master based external interface system will generally require less data buffering ability since the master has the ability to initiate data transfers as necessary. The slave interface may require more data buffering since the slave lacks control of the data interface and thus can only transfer data when the slave receives permission from the interface master to transfer data.

Conventional Management Overview

With a simple convolution neural network, current neural network processing systems operate in a very simple straightforward manner. To describe conventional neural network processing system operation, an example of processing the three-layer neural network illustrated in FIG. 1B will be presented with reference to FIG. 4.

Figure 4:
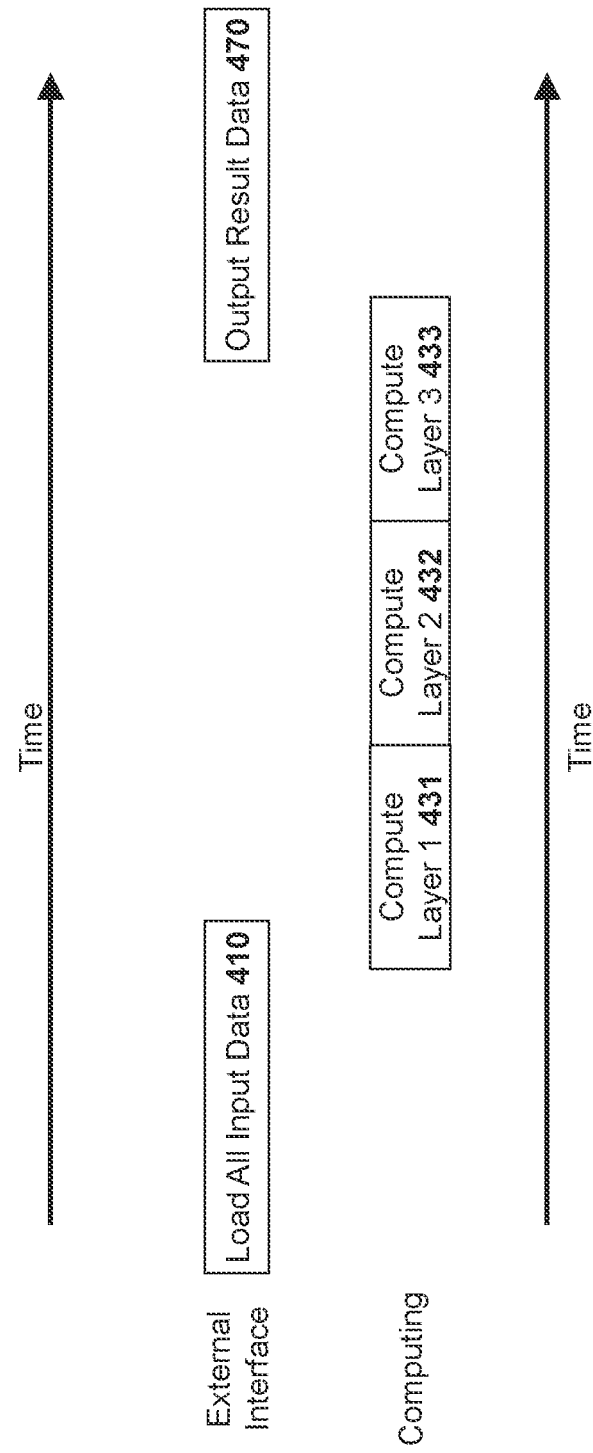
FIG. 4 illustrates an example of conventional processing of a matrix operation.

Referring to FIG. 4, the first step is to load in all the tensor input data completely into the neural processing unit. This is illustrated in FIG. 4 as input data 410 being loaded on an external interface. When sufficient input tensor data has been loaded into memory, the system can start processing tensor data. This is illustrated as the system processing Layer 1 431. Note that computation of layer 1 431 can start before all of the data has been loaded in. The neural processing system then processes through all the convolution neural network layers as illustrated with Layer 2 432 and Layer 3 433 being processed until the full three-layer neural network is completely processed with a final output result. When output result data is available, the neural processing system can begin sending out the output result data, as illustrated in FIG. 4, with output data 470 being sent out on the external interface.

There are several problems with this traditional system. One of the biggest disadvantages is that this is very wasteful of the input/output bandwidth available on the external I/O interface. Specifically, the system first uses the I/O bandwidth to load in the input data 410, but then the system allows the I/O bandwidth of the external interface to sit completely idle while the data is processed through all the neural network layers. Only after all the matrix computations of Layer 1 431, Layer 2 432, and Layer 3 433 does the system finally begin using the external interface again to send out the final result data 470. Thus, in such a system the I/O bandwidth may need to be overprovisioned as an expensive high-speed interface in order to minimize latency in such a system.

Another disadvantage of the technique illustrated in FIG. 4 is that this is a very high latency solution. Specifically, the technique illustrated in FIG. 4 does very little to take advantage of the natural parallelism inherent in the computational problem. There is a small amount of parallelism in that the processing for layer 1 431 can begin before all of the input data 410 has been received and that the result output data 470 can begin to be sent out before completing the processing for the final layer (layer 3 433). But other than that, all of the processing operations performed in the system of FIG. 4 are done serially and thus this system has high latency.

Yet another disadvantage of the system illustrated in FIG. 4 is that the computational circuitry is not efficiently utilized. Initially, the computational circuitry must wait until enough data has been loaded into the system before it can commence with the computation of layer 1 431. And once the three layers of computation of are completed, the computational circuitry sits idle until additional input data to process is loaded in.

One final additional problem with this traditional solution of FIG. 4 is that this traditional system requires large amounts of buffer memory within the neural processor unit for storing all of the input data, the intermediate results that are created during the neural network processing, and the final output data. Thus, due to all of these shortcomings, serious improvements are needed.

Matrix Processor Array with Improved External Data Input

To improve upon the traditional system, the present invention uses a data loading system that more efficiently utilizes the very valuable external interface bandwidth. Additionally, the computational circuits are utilized in a much more efficient manner. The end results of these improvements reduce the calculation latency and reduce the amount of memory required within the network processing unit.

FIGS. 5A to 5C illustrate one embodiment of how a proposed improved system can operate. Referring to FIG. 5A, the neural processing unit issues a first data load operation 511 for a first subset of tensor data needed for a compute operation. To be able to quickly begin computations, the subset of tensor data may be read directly into the matrix processing units that will perform the compute operations. For example, referring to FIG. 3A, the DMA unit 381 may read in the subset of tensor data from external interface 395 directly into the matrix processors (MP) of the matrix processor array 397 such that the subset of tensor data is immediately ready for compute operations. The compute operation 531 can then immediately commence after the data load 511 is complete.

Next, as illustrated in FIG. 5B, while the compute operation 531 is being performed, the DMA unit 381 may read in an additional subset of tensor data from the external interface 395 with data load operation 512. Thus, the system is both computing results (compute operation 531) and loading in an additional subset of tensor data simultaneously (data load operation 512). The second data load 512 operation may load the subset of tensor data into a buffer such as the VSP memory within the Vector Scalar Processor 371 since the matrix processors in the matrix processor array 397 are currently busy processing the compute operation 531.

After the first compute operation 531 has completed, the neural processing unit 300 may execute a very fast data move (DM) 522 operation to load the newly obtained subset of tensor data into the matrix processor array 397 of the neural processing unit 300. This data move (DM) 522 operation is completely local within the neural processing unit 300 and thus very quick. Then a second computation operation 532 may commence on that second subset of tensor data. Note that both the external interface 395 and the matrix processor array 397 have both been kept very busy thus maximizing utilization of the hardware resources in the neural processing unit 300.

The neural processing unit can carry on in this manner of highly parallelized operation. Thus, as illustrated in FIG. 5C, while the second compute operation 532 is being executed, the DMA unit 381 may read in a third subset of tensor data from the external interface 395 with data load operation 513. This third data load 513 operation is performed simultaneously with the second compute operation 532. The third data load operation 532 loads the third subset of tensor data into a buffer such as memory within the Vector Scalar Processor 371 while the matrix processors in the matrix processor array 397 are busy processing the second compute operation 532. After the second compute operation 532 has completed, the neural processing unit 300 may execute a very fast data move (DM) 523 operation to load the newly obtained third subset of tensor data into the matrix processor array 397 of the neural processing unit 300 and then begin another compute operation 533.

Referring to FIGS. 5A to 5C, it can be seen that both the external interface 395 and the matrix processor array 397 have both been kept very busy performing operations. In this manner, the disclosed system provides better utilization of the hardware resources and reduces latency.

Matrix Processor Array with Interleaved External Data Input and Output

The example of FIGS. 5A to 5C illustrate an external data source being accessed to input tensor data for processing. However, both the input and the output of data on the external interface can be interleaved to even further improve the utilization of hardware resources.

FIG. 6 illustrates a timeline diagram of the activity on an external interface 395 and computing operations being performed within the matrix processors of the matrix processor array 397 for a neural network computation. Initially a first subset of tensor data is loaded with input operation 611. Once that first subset of tensor data has been loaded, the matrix processors in the matrix processor array can begin computation operation 631.

While computation operation 631 is executing, the neural processing unit can load in additional subsets of data tensors. Specifically, input operation 612 and input operation 613 can be performed while the matrix processors perform computation operation 631 thus performing efficient parallelized operations.

When computation operation 631 is completed, the system can then output the results of that computation with output operation 671. Simultaneously, the matrix processors can execute a subsequent computation operation 632, thus again performing efficient parallelized operations.

While the matrix processors are performing computation operation 632, the external interface 395 can input additional subsets of tensor data. Specifically, input operation 614 can be performed after the completion of output operation 671. Thus, one can see that the bandwidth of the external interface 395 is being used very efficiently with minimal waste.

When computation operation 632 is completed, the system cannot immediately output the results of that computation since input operation 614 is still being performed. But since data has already been loaded, the matrix processors can immediately begin computation operation 633. When input operation 614 completes, the neural processing unit can then output the data from computation operation 632 with output operation 672.

Next, when computation operation 633 completes, the system can immediately begin computation operation 634 since the needed subset of tensor data has already been loaded. And when output operation 672 completes, the output data from computation operation 633 can be sent out with output operation 673. Following output operation 673, the external interface can then continue inputting more data with input operation 614.

As can be seen in FIG. 6, the interleaving of input and output operations allows efficient utilization of both the external interface and the matrix processors.

Data Compression

As can be seen from the operational example illustrated in FIG. 6, a large amount of data is constantly moving in and out of neural processing units to perform these large data intensive matrix operations. To reduce the amount of memory needed to store data and to reduce the amount of external interface bandwidth usage, the system of the present invention may implement compression and decompression of data.

Referring back to FIG. 6, the top part of the timeline illustrates a set of input and output data operations wherein data is either input from external storage into a neural processing unit or is output from the neural processing unit to external storage. During any or all of those operations, the data may be compressed and decompressed on the fly using logic within the neural processing unit.

Matrix Processor Array Operating Out-Of-Order

Neural networks are generally processed in a simple straightforward order progressively through the different layers of the neural network. Specifically, first layer 1 is fully calculated, then layer 2 is fully calculated, then layer 3 is fully calculated, and so on as illustrated in the timeline example of FIG. 4. However, operating in this manner can miss some parallelism inherent in a neural network that can be used to better optimize the utilization of hardware resources such as the memory storage, memory bandwidth, and processing capability of the neural network processing unit.

An example of parallelism can be illustrated by referring back to the sparse neural network of FIG. 1C. Referring to FIG. 1C, intermediate result 141 only relies upon input data 101 and input data 102. Thus, if a neural network processing unit has input data 101 and input data 102 loaded in local memory but input data 103 and input data 104 have not been loaded into local memory yet, then that neural network processing unit can go ahead and calculate intermediate result 141 before receiving input data 103 and input data 104 that make up the full input tensor data vector. Specifically, the neural processor unit can combine input data 101 and input data 102 to calculate intermediate result 141 while simultaneously loading input data 103 and input data 104 and thereby achieving greater utilization by taking advantage of parallelism.

This type of more efficient operation using parallelism can be taken further by performing computation operations for later neural network layers before fully completing the current neural network layer. In this manner, there are more options for computations that can be performed such that the system can further optimize the use of resources within the system.

Figure 7:
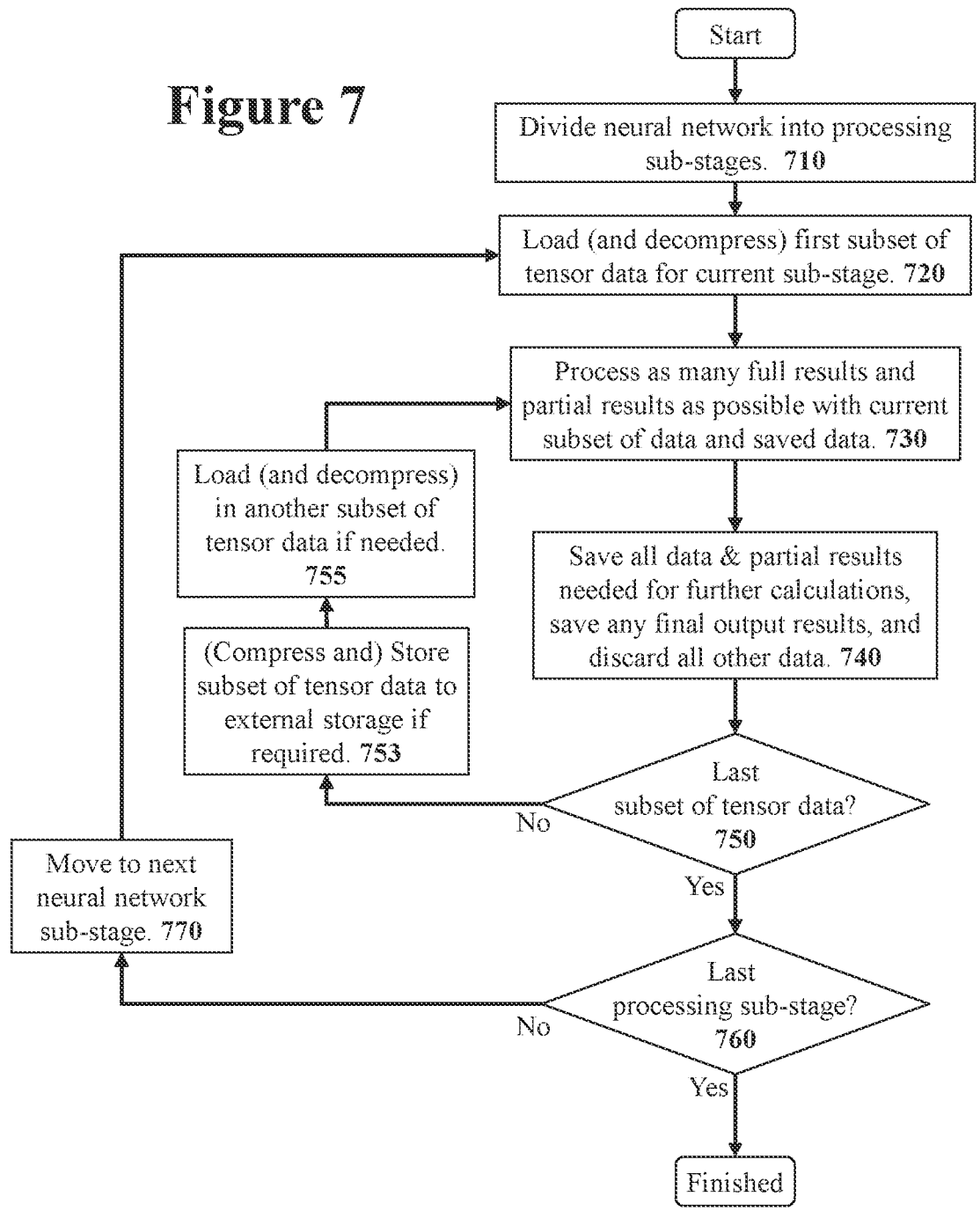
FIG. 7 illustrates a flow diagram describing how out-of-order processing can provide more computation options in order to further increase the utilization of system resources.

FIG. 7 illustrates the basic operation of how a neural processing unit may operate to perform additional calculations in other layers when possible. The description of the operation of FIG. 7 will be described with reference to the example sparse neural network illustrated in FIG. 1C and the timing diagram of FIG. 8A. Initially, at step 710, the system divides the neural network into various processing stages. In this manner, the computational problem is divided into individual processing stages that can be processed easier.

Next, at step 720, a neural processing unit loads a first subset of tensor data to be processed. (Again, note that the system may decompress the data on the fly during load operations.) Referring back to the example of FIG. 1C, this subset of tensor data may be just input data 101 and input data 102 to begin processing as illustrated with load operation 811 in FIG. 8A. Next, at step 730, the neural processing unit then processes as many full or partial results as it can calculate with the current subset of tensor data and any saved intermediate data that it may have. This is performed by using the dependency information in the neural network. For example, referring back to FIG. 1C, one can see that intermediate results 141 and 142 in the first layer can be calculated with just input data 101 and input data 102. Thus, the neural processing unit can calculate intermediate results 141 and 142 with processing operations 831 and 832, respectively, as illustrated in FIG. 8A. While processing operations 831 and 832 are being performed, the external interface can be used for other load or store operations 812 as illustrated in FIG. 8A.

In addition to calculating intermediate results 141 and 142, the final output 151 can also be calculated using intermediate result 141 and intermediate result 142 as illustrated by the dependency information in FIG. 1C. These dependencies are represented by the connections, shown as lines between nodes on one neural processing layer and the next neural processing layer. Thus, in step 730 the system can also calculate final output 151 with operation 833 thereby keeping the matrix processors busy since additional data is not yet available. Note that during this calculation input data 101 and input data 102 can be loaded simultaneously with load operation 813. At this point, the system has calculated all it can calculate based upon the load data that is available and proceeds to the next step.

Referring back to FIG. 7, at step 740 the system saves all the input data and partial results needed for further calculations, saves any final output results, and discards all other data. In this example, input data 102 is saved since it is needed to calculate intermediate result 143; intermediate result 141 is saved since it is needed to calculate output 152; intermediate result 142 is saved since it is needed to calculate output 153; and final result 151 is saved since it is a final result. But input data 101 can be discarded since it is no longer needed to calculate any other results. Again, this dependency information is extracted from the neural network illustrated in FIG. 1C. By discarding unnecessary data, the system reduces the amount of memory required.

Next, at step 750, the system determines if that was the last subset of data. If there is additional data, the system proceeds to step 753, wherein the system may store any intermediate or final data if needed to free up memory. (Note that this store operation may include compressing the data.) This store operation is illustrated as load/store operation 814 in FIG. 8A.

Next, the system proceeds to step 755 to load in another subset of tensor data if needed. (This may involve decompressing the data while loading the data.) In the example illustrated in FIG. 8A, the system has already loaded input data 103 and input data 104. With that newly loaded subset of tensor data, the system returns to step 730 to again processes as many full or partial results as it can calculate with the current subset of data and any saved data that it may have, according to the dependency information inherent in the neural network.

Referring back to step 750, when the last subset of tensor data has been processed, the system proceeds to step 760 to determine if there are additional sub-stages to process. If there are additional sub-stages, the system proceeds to step 770 where the system moves to the next sub-stage for processing. Thus, the system returns to step 720 to load in a subset of tensor data for the next sub-stage. Note that the system may have already pre-fetched this subset of tensor data using the techniques described previously in this document. With the loaded subset of tensor data, the system can then calculate intermediate result 143 with operation 834, as illustrated in FIG. 8A.

Referring back to step 760, if this was the last sub-stage, then processing is complete.

By being able to process data out of the strict normal layer-by-layer order, the system is able to extract more parallelization and thus better utilize the available hardware resources.

Storing and Reloading Intermediate Data

Hardware resources such as the local memory storage, memory bandwidth, and processing capability are very valuable and thus care must be taken to use these resources efficiently. As previously set forth, the disclosed system discards data that is no longer needed for future calculations to free up local memory. Another technique that can be used to optimize resource utilization is to temporarily move data out of the local high-speed memory if that data is not immediately needed. In this manner, the system frees up more valuable memory for other data. The stored intermediate data can then be reloaded by the system at a later time when the stored data is necessary.

Figure 8B:
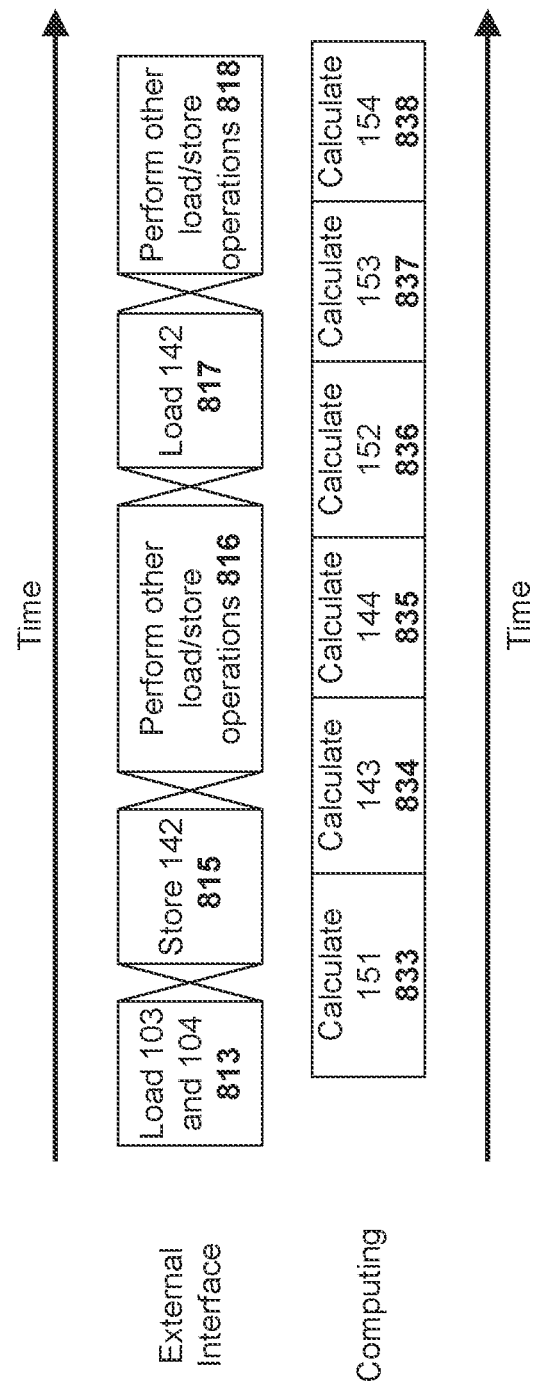
FIG. 8B illustrates a continuation of the timing diagram of FIG. 8A wherein intermediate data is stored externally and then reloaded into a neural processing unit.

Referring back to the example of FIG. 1C, the intermediate data 142 was not discarded since it would be needed for a later calculation. Specifically, intermediate data 142 is needed to calculate output 154 as can be seen in the dependency information in FIG. 1C. However, since the calculation of output 154 will not be performed soon, the system may elect to store intermediate data 142 until it is required later in order to free up memory. FIG. 8B illustrates a timeline of an example of this technique. Note that this is a simplified example and that in a typical operation there may be thousands of units of data and a much longer time between the later operation.

FIG. 8B illustrates a continuation of the timeline of FIG. 8A starting at the load operation 813 of input data 103 and 104 and the calculation operation of final data 151. At that point, the system may elect to store intermediate data 142 with store operation 815. This store operation frees up memory for other operations.

The system then proceeds with the other calculations where intermediate data 143 and 144 are calculated with operations 834 and 835, respectively. Final output 152 is then calculated with operation 836. At this point in this simple example, it is coming close to when intermediate data 142 will be needed again, and thus, the system commences load operation 817 to re-load in intermediate data 142 into the local memory. Simultaneously with this load operation 817, computations can continue in the matrix processors. Specifically, final output 153 is calculated with operation 837 while intermediate data 142 is being re-loaded into the neural processing unit with the external interface using operation 817. As a last illustrated step of this example of FIG. 8B, the final output 154 is calculated with computation operation 838 using the intermediate data 142 after reloading it back into local memory. Further load or store operations can be performed during operation 838 to calculate the final output 154. For example, the system may send out final outputs 151, 152, and 153 if they have not already been sent out. Alternatively, the system may begin loading in subsets of data tensors for a later operation.

The preceding technical disclosure is intended to be illustrative and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of accessing an external memory repository to a neural network processor while performing a neural network operation for a multilayer neural network, said method comprising the steps of:
   loading, from an external interface, a first subset of tensor data for said neural network operation;
   loading, from said neural network processor, intermediate result tensor data for said neural network operation;
   processing said first subset of tensor data and said intermediate result tensor data by a first partial layer computation by a first layer of said neural network operation in a matrix processor array to generate a subset of temporary tensor data to be used in a first subsequent layer or at least one second subsequent layer of said multilayer neural network;
   loading, from said external interface, in parallel with and prior to completion of said processing of said first subset of tensor data and said intermediate result tensor data, a second subset of tensor data from said external memory repository into a first buffer within said neural network processor, said first buffer comprising a vector scalar processor coupled by an operand bus to a plurality of matrix processor circuits within said matrix processor array;
   saving a first subset of said subset of temporary tensor data as said intermediate result tensor data in a second buffer having a local storage memory and discarding a second subset of said subset of temporary tensor data not required for subsequent computation of said multilayer neural network;
   executing a data move operation to load the second subset of tensor data from said first buffer and said intermediate result tensor data from said second buffer into said matrix processor array; and
   processing said second subset of tensor data and said intermediate result tensor data by a second partial layer computation by said first layer of said neural network operation in said matrix processor array to generate an updated subset of temporary tensor data to be used in said first subsequent layer or said at least one second subsequent layer of said multilayer neural network.

2. The method of accessing an external memory repository to a neural network processor while performing a multilayer neural network operation as set forth in claim 1, wherein said first subset of tensor data from said external memory repository, required for additional computation of said multilayer neural network operation, comprises a subset of tensor input data for a new neural network operation.

3. The method of accessing an external memory repository to a neural network processor while performing a multilayer neural network operation as set forth in claim 1, wherein said first subset of tensor data from said external memory repository comprises a set of matrix weights required for additional computation of said multilayer neural network operation.

4. The method of accessing an external memory repository to a neural network processor while performing a multilayer neural network operation as set forth in claim 1, wherein said first subset of tensor data from said external memory repository comprises a subset of data previously stored in said external memory repository.

5. The method of accessing an external memory repository to a neural network processor while performing a multilayer neural network operation as set forth in claim 1, said method further comprising:
   reloading said intermediate result tensor data from said second buffer.

6. The method of accessing an external memory repository to a neural network processor while performing a multilayer neural network operation as set forth in claim 1, said method further comprising:
   storing said set of temporary data as a final result of said multilayer neural network operation in said external memory repository.

7. The method of claim 1, further comprising:
   loading, from said external interface, in parallel with and prior to completion of said processing of said second subset of tensor data and said intermediate result tensor data, a third subset of tensor data from said external memory repository into a buffer within said neural network processor;
   executing a further data move operation to load the third subset of tensor data and said updated subset of temporary tensor data from said buffer into said matrix processor array; and
   processing said third subset of tensor data and said updated intermediate result tensor data by a third partial layer computation by said first layer of said neural network operation in said matrix processor array to generate a further updated subset of temporary tensor data to be used in said first subsequent layer or said at least one second subsequent layer of said multilayer neural network.

8. A neural network processor apparatus for performing a multilayer neural network computation, said neural network processor apparatus comprising:

an external data interface, said external data interface coupled to memory storage outside of said neural network processor apparatus;
a vector scalar processor coupled to said external data interface, said vector scalar processor for receiving incoming data;
an array of matrix processor circuits coupled to said vector scalar processor by an operand bus, said array of matrix processor circuits for performing matrix operations;
an accumulation buffer coupled to said array of matrix processor circuits, said accumulation buffer having a local storage memory;
a scheduler and sequence processor coupled to said vector scalar processor and further coupled to said array of matrix processor circuits
said scheduler and sequence processor issuing cycle commands to said vector scalar processor and to said array of matrix processor circuits, said cycle commands causing said array of matrix processor circuits to:
load, from said external data interface, a first subset of tensor data for said multilayer neural network computation;
load, from said neural network processor apparatus, intermediate result tensor data for said multilayer neural network computation;
process said first subset of tensor data and said intermediate result tensor data by a first partial layer computation by a first layer of said multilayer neural network computation to generate a subset of temporary tensor data to be used in a first subsequent layer or at least one second subsequent layer of said neural network processor apparatus;
load, from said external data interface, in parallel with and prior to completion of said processing of said first subset of tensor data and said intermediate result tensor data, a second subset of tensor data from said external memory repository into a first buffer within said neural network processor apparatus, said first buffer comprising said vector scalar processor;
save a first subset of said subset of temporary tensor data as said intermediate result tensor data in a second buffer, said second buffer comprising said accumulation buffer, and discard a second subset of said subset of temporary tensor data not required for subsequent computation of said multilayer neural network computation;
execute a data move operation to load the second subset of tensor data from said first buffer and said intermediate result tensor data from said second buffer into said array of matrix processor circuits; and
process said second subset of tensor data and said intermediate result tensor data by a second partial layer computation by said first layer of said multilayer neural network computation in said array of matrix processor circuits to generate an updated subset of temporary tensor data to be used in said first subsequent layer or said at least one second subsequent layer of said neural network processor apparatus.

9. The neural network processor apparatus as set forth in claim 8, wherein said first subset of tensor data from said external memory repository comprises a subset of tensor input data for a new neural network operation.

10. The neural network processor apparatus as set forth in claim 8, wherein said first subset of tensor data from said external memory repository comprises a set of matrix weights for a neural network operation.

11. The neural network processor apparatus as set forth in claim 8, wherein said cycle commands further cause said array of matrix processor circuits to reload said intermediate result tensor data from said second buffer.

12. The neural network processor apparatus as set forth in claim 8, wherein said cycle commands further cause said array of matrix processor circuits to store said subset of temporary tensor data as a final result of said multilayer neural network operation in said external memory repository.

13. The neural network processor apparatus of claim 8, each matrix processor circuit of the array of matrix processor circuits comprising a control system coupled by a control bus to a local wide static random access memory bank, the local wide static random access memory bank coupled to a bank of multiplexors, the bank of multiplexors coupled to an operand register and a bank of multiply and accumulate units.

14. A method of accessing an external memory repository to a neural network processor while performing a neural network operation for a multilayer neural network, said method comprising the steps of:
loading, from an external interface, a first subset of tensor data for said neural network operation;
loading, from said neural network processor, intermediate result tensor data for said neural network operation;
processing said first subset of tensor data and said intermediate result tensor data by a first partial layer computation by a first layer of said multilayer neural network in a matrix processor array to generate a first subset of temporary data to be used in a first subsequent layer or at least one second subsequent layer of said multilayer neural network;
loading, from said external interface, in parallel with and prior to completion of said processing of said first subset of tensor data and said intermediate result tensor data, a second subset of tensor data from said external memory repository into a first buffer within said neural network processor, said first buffer comprising a vector scalar processor coupled by an operand bus to a plurality of matrix processor circuits within said matrix processor array;
processing said first subset of tensor data and said intermediate result tensor data by a second partial layer computation for the first subsequent layer of said multilayer neural network in said matrix processor unit to generate a second subset of temporary data to be used in a subsequent layer of said multilayer neural network;
saving a subset of said set of temporary data as intermediate result tensor data in a second buffer having a local storage memory;
executing a data move operation to load the second subset of tensor data from said first buffer into said matrix array;
processing said second subset of tensor data and said intermediate result tensor data by a second partial layer computation by said first layer of said neural network operation in said matrix processor array;
reloading said second subset of temporary data to process said at least one second subsequent layer of said multilayer neural network;
calculating a first final output of said neural network operation of said at least one second subsequent layer.

15. The method of accessing an external memory to a neural network processor while performing multilayer neural network operations as set forth in claim 14, wherein said first subset of tensor data from said external memory repository comprises a subset of tensor input data for a new neural network operation.

16. The method of accessing an external memory to a neural network processor while performing multilayer neural network operations as set forth in claim 14, wherein said first subset of tensor data from said external memory repository comprises a set of matrix weights for a neural network operation.

17. The method of accessing an external memory to a neural network processor while performing multilayer neural network operations as set forth in claim 14, wherein said first subset of tensor data from said external memory repository comprises a subset of data previously stored in said external memory repository.

18. The method of accessing an external memory to a neural network processor while performing multilayer neural network operations as set forth in claim 14, said method further comprising:

reloading said intermediate result tensor data from said second buffer.

19. The method of accessing an external memory to a neural network processor while performing multilayer neural network operations as set forth in claim 14, said method further comprising:

storing said set of temporary data as a final result of said multilayer neural network operation in said external memory repository.

20. The method of accessing an external memory repository to a neural network processor while performing a neural network operation for a multilayer neural network of claim 14, each matrix processor circuit of the array of matrix processor circuits comprising a control system coupled by a control bus to a local wide static random access memory bank, the local wide static random access memory bank coupled to a bank of multiplexors, the bank of multiplexors coupled to an operand register and a bank of multiply and accumulate units.

* * * * *

UNITED STATES PATENT AND TRADEMARK OFFICE
CERTIFICATE OF CORRECTION

PATENT NO. : 12,008,463 B2
APPLICATION NO. : 17/848316
DATED : June 11, 2024
INVENTOR(S) : Siyad Ma, Shang-Tse Chuang and Sharad Chole It is certified that error appears in the above-identified patent and that said Letters Patent is hereby corrected as shown below:

In the Specification

In Column 1, Lines 7-10:
"The present disclosure is a continuation-in-part and claims the priority benefit of U.S. Patent Application Serial No. 17/504,488, filed on October 18, 2021, and titled "Method and Apparatus for Efficiently Processing Convolution Neural Network Operations.""

Should be amended to read:
"The present disclosure is a continuation-in-part and claims the priority benefit of U.S. Patent Application Serial No. 17/504,488, filed on October 18, 2021, and titled "Method and Apparatus for Efficiently Processing Convolution Neural Network Operations", which is a continuation of U.S. Patent Application Serial No. 16/568,195, filed on September 11, 2019, and titled "Method And Apparatus For Efficiently Processing Convolution Neural Network Operations." The aforementioned disclosures are hereby incorporated by reference herein by their entirety including all references cited therein."

Signed and Sealed this
Twenty-seventh Day of August, 2024

Katherine Kelly Vidal
*Director of the United States Patent and Trademark Office*